Nov. 24, 1942.    J. H. KENNEDY ET AL    2,302,870
METHOD AND APPARATUS FOR SEPARATING DESIRED MATERIALS
FROM PARTICULATE AGGREGATES
Filed May 21, 1940    7 Sheets-Sheet 1
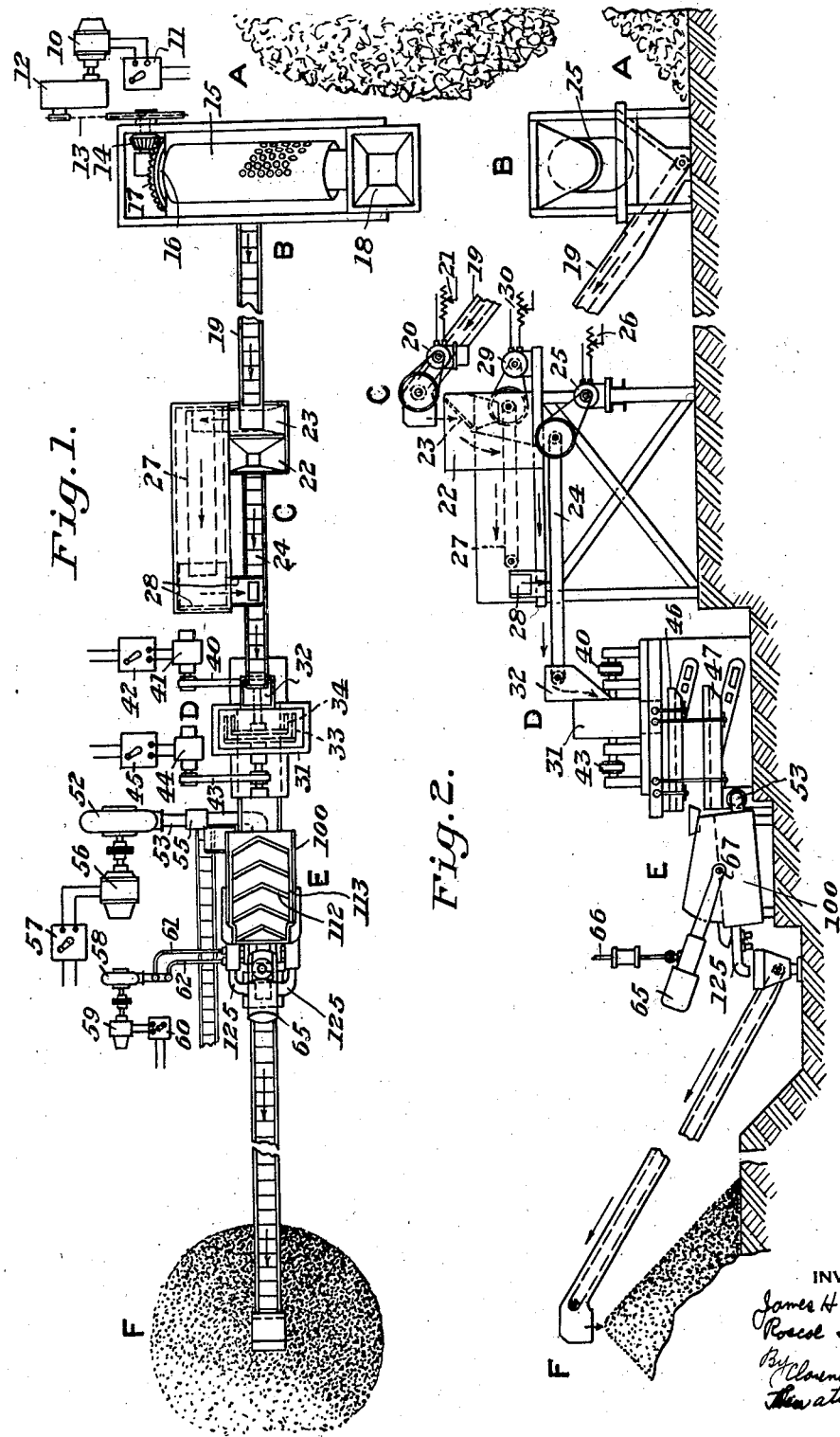
INVENTOR
James H. Kennedy
Roscoe F. Ballard
By Clarence P. Byrnes
their attorney Nov. 24, 1942.  J. H. KENNEDY ET AL  2,302,870
METHOD AND APPARATUS FOR SEPARATING DESIRED MATERIALS
FROM PARTICULATE AGGREGATES
Filed May 21, 1940    7 Sheets-Sheet 2
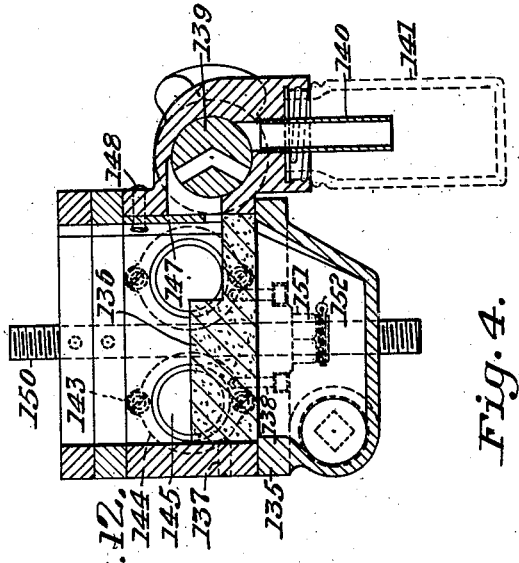
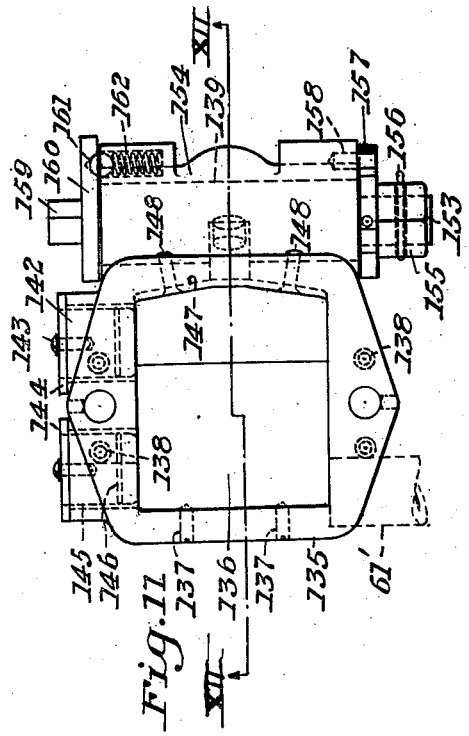
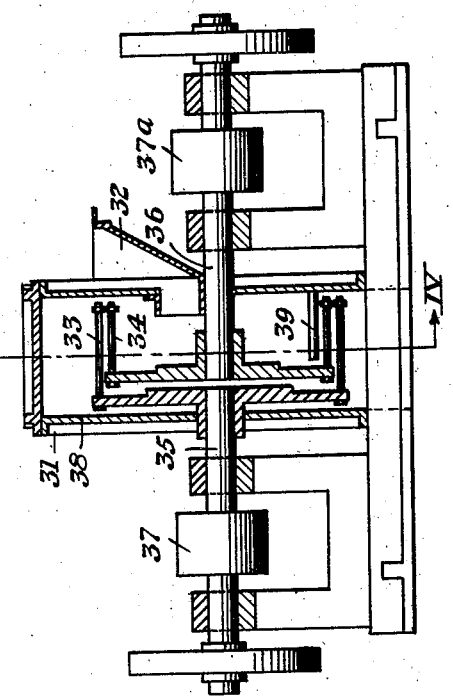
INVENTOR
James H. Kennedy
Roscoe F. Ballard
By Clarence P. Byrnes
Their attorney

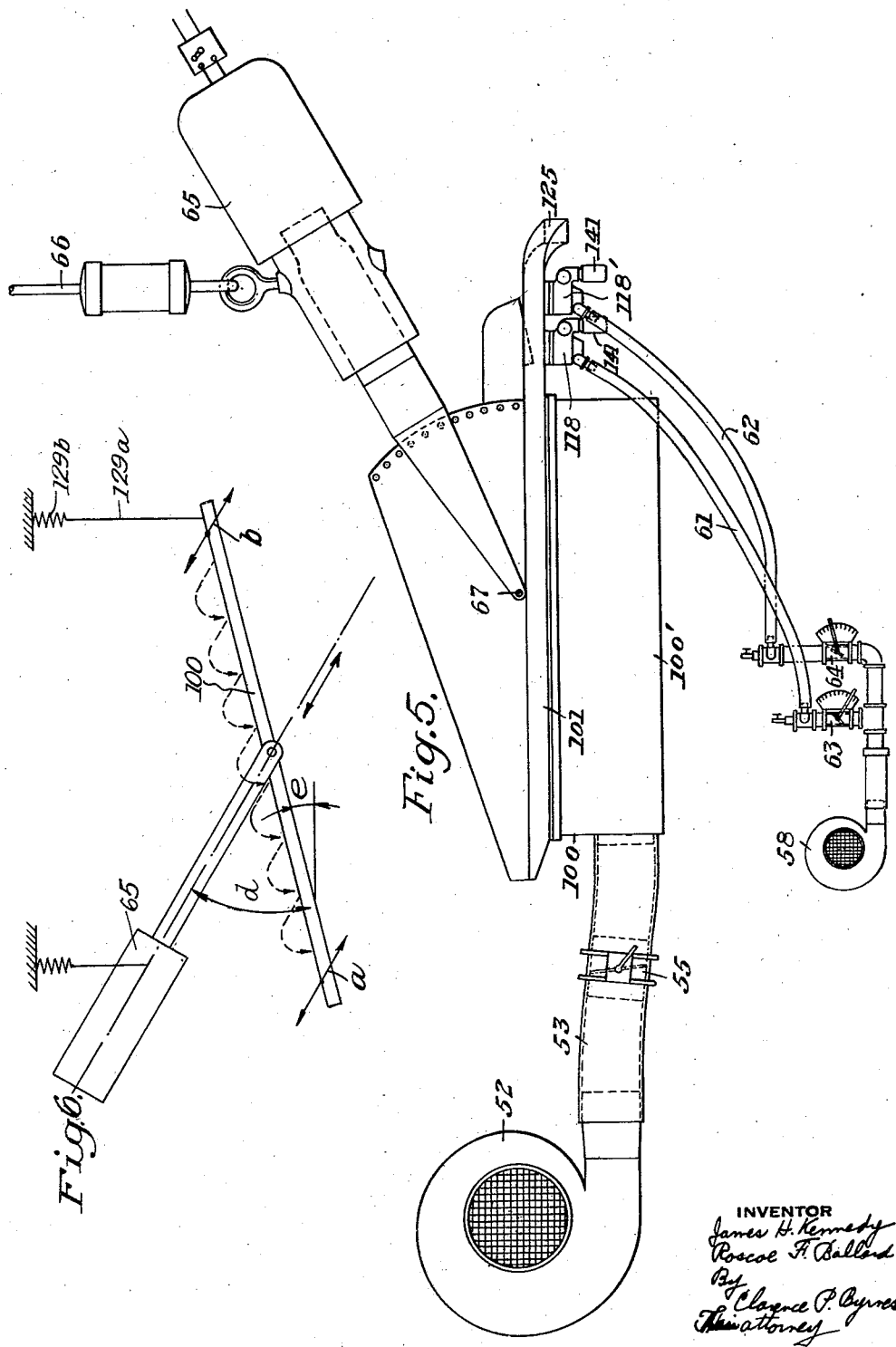

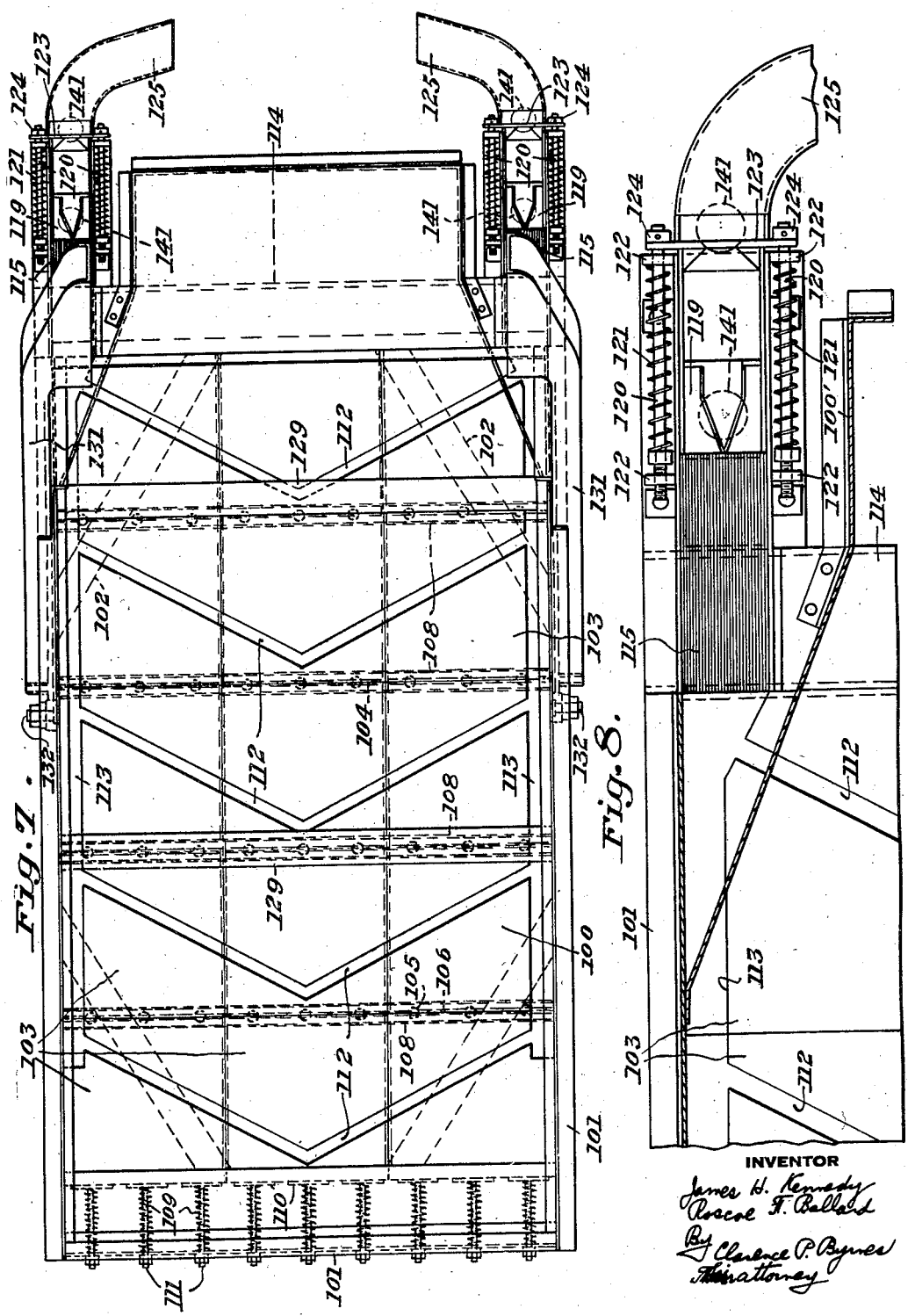

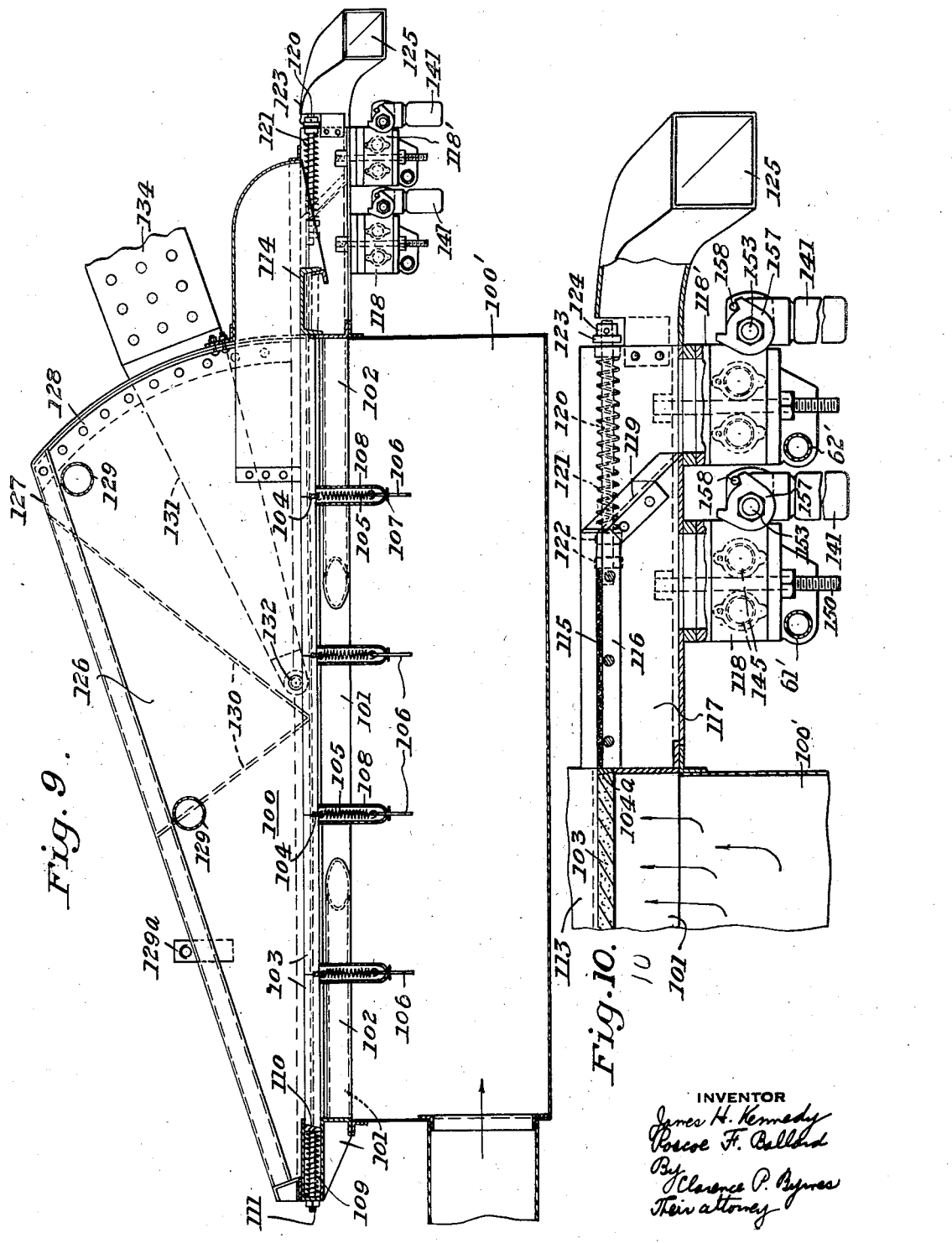

Nov. 24, 1942.                J. H. KENNEDY ET AL                 2,302,870
          METHOD AND APPARATUS FOR SEPARATING DESIRED MATERIALS
                         FROM PARTICULATE AGGREGATES
                              Filed May 21, 1940           7 Sheets-Sheet 6
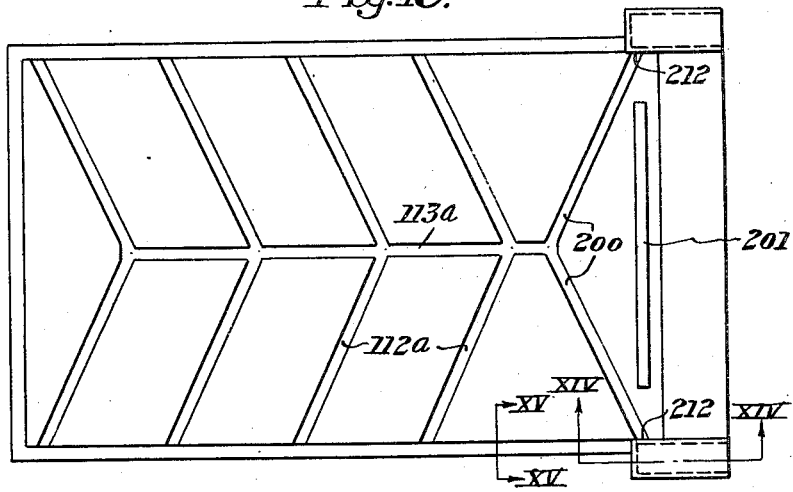
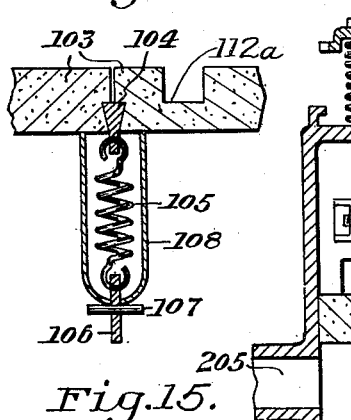
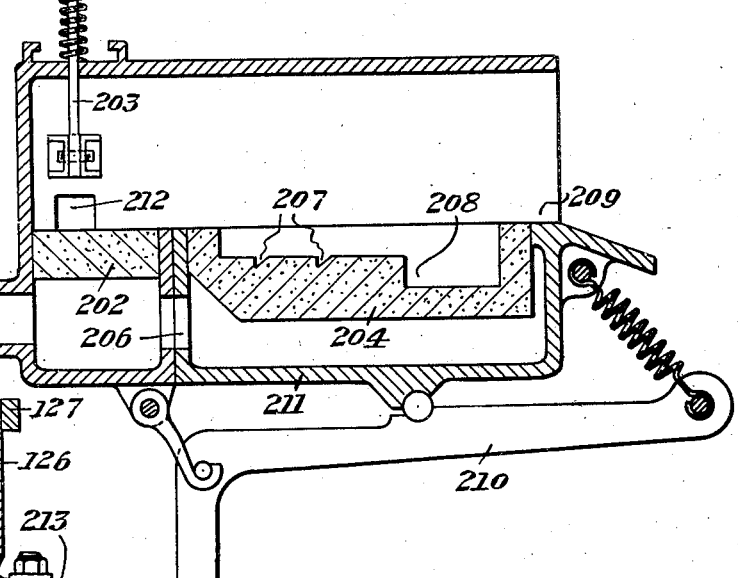
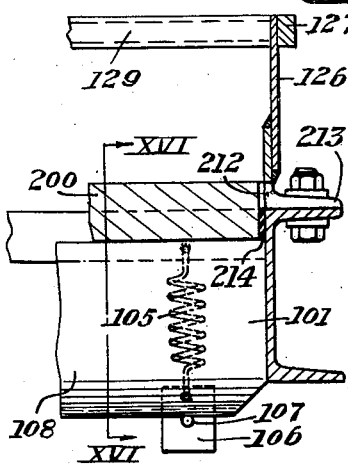

Patented Nov. 24, 1942

2,302,870

UNITED STATES PATENT OFFICE 2,302,870

METHOD AND APPARATUS FOR SEPARATING DESIRED MATERIALS FROM PARTICULATE AGGREGATES

James H. Kennedy, Lansdowne, and Roscoe F. Ballard, Chester, Pa., assignors to Morgan Concentrating Corporation, Philadelphia, Pa., a corporation of Delaware Application May 21, 1940, Serial No. 337,320

29 Claims. (Cl. 209—467)

This invention relates to the concentration or segregation of materials or particles representing the value content of aggregate, heterogeneous, or mass materials. It relates particularly to improved apparatus and procedure for recovering the value content of such materials especially where the value content has a greater specific gravity than the undesired portions of such materials.

In one aspect, our invention deals with the segregation or concentration of desired portions or particles of the materials regardless of their size. In a sense, the invention relates to the dry separation of heavier specific gravity constituents of a heterogeneous or aggregate material. By dry separation, we mean that no liquid is required in the process. We have found that we can work on different materials ranging in relative dryness from bone dry to a moisture content where water is practically oozing out.

In recovering desired materials such as those of mineral origin at placer mine locations, we find that the value content or the valuable particles exist not only as free particles but also in physical combination with an aggregate such as sand, silt, clay, quartz, lime, loam, etc. It is apparent that this will complicate the separation of the value content. There is no particular difficulty in separating larger size particles of the value content such as gold. However, for commercial recovery, the process must be capable of separating out value content of what may be termed a flour-like size. Referring particularly to the recovery of gold, probably 80% will pass a 50 mesh screen and almost as much will pass a 100 mesh screen; this is characteristic of dry placer deposits. Also the value content may be a small percentage of the total volume of the mass or materials from which it is to be separated. We find it advisable to release the finer particles of the value content from the gangue that are mechanically combined as conglomerates with natural materials such as clay or slit before actually effecting the concentrating operation.

In our test work at a placer location in California, material was run through a concentrating machine, constructed in accordance with the Morgan Patent No. 2,155,235, and on this run about ten cents worth of material was recovered per cubic yard of material run through. After careful examination and experimentation, we found that this low recovery was mainly due to the fact that the larger percentage of gold was in the conglomerate form. The tailings from this run were then disintegrated or broken up so as to free the minerals from the conglomerated pieces.

A dry process to be successful and economical must, in view of our experiments and discoveries, be one which will be capable of treating large yardages of material and separating the relatively small percentages of fine precious particles which are present in such yardages, at a relatively low cost.

The above problems emphasize the fact that a successful type of apparatus or process for the purposes enumerated must, in the first place, be capable of control and adjustment, whereby it may take care of relatively different types of aggregate masses, such as may be found at different placer locations. Furthermore, it should be capable of breaking up the conglomerates which contain the precious metals or minerals with a minimum loss of power and with a minimum grinding of materials.

In our preferred apparatus, therefore, there are preferably three units, each feeding to the next, and arranged with the grading device or scalper first, this being preferably a grizzly screen which removes larger material, such as boulders and large stones.

From this unit, the remaining material, up to say, 1½", is automatically and continuously fed into the second unit, the disintegrator, where the conglomerates are broken up. Then the broken up material passes on and is automatically and continuously fed to the third unit, the concentrator, which is preferably of a type such as shown herein. The automatic mechanisms for feeding from one unit to the next and from the concentrator to the tailing pile are preferably flexible and may be belt conveyors, driven at proper variable speeds.

Referring now to the concentration of properly prepared material, containing values, we have found that to operate a concentrator substantially continuously on a large volume of material, after the contained capacity of the table is reached, involves serious difficulties.

The use of skimmers to slice off and remove an upper layer or layers of relatively lighter, non-value bearing material has been proposed and attempted. We have discovered that any such operation acts to dam back and slow the flow along a concentrating table, for example, such as shown in the Morgan Patent No. 2,155,235. Any such substantial damming back of even upper strata or slowing of flow, after depositing of heavier material in flutes, channels, riffles or grooves, will cause rising and exit of the heavier material and serious loss thereof.

For continuous operation, we have found that the aggregate material should be activated in such a manner as to, in effect, simulate a fluid during its movement over the concentrating bed or table. The simulated fluid should have a low simulated viscosity to permit a quick separating out of the desired value content. The desired value content should be as quickly as possible separated out from the undesired particles to fall on the bed and to remain on the bed without reprojection. The concentrating action should be such as to prevent the setting up of localized or eddy-like currents; in other words, the activation of the materials and the bed should be of a substantially uniform type throughout the extent thereof. Remixing should be prevented and the value content should be fed off the bed into collector means without damming up the flow. It is thus apparent that there are many factors involved in continuous operation that are not absolutely vital in intermittent operation of the type that may be accomplished by the table of the Morgan Patent 2,155,235.

After careful study and experimenting, we discovered that the skimming action at the discharge point for the flute system caused damming back and stopping of the apparent flotation in this region. The result of this slowing up of the forward flow of material was to reduce the relative volume of air in this region, causing the heavier values to climb out of the flutes and enter the tailings, passing away from the table.

We then experimented until we found that a way must be provided of separately removing the flute materials from the bed without materially slowing up or damming back the flow of material in the flutes or grooves without the use of any mechanical skimmer and without reducing the apparent flotation on the bed sufficiently to cause climbing out and loss of values from the table.

We finally solved these difficult problems by feeding the flute material away from the table without materially slowing up or damming it back thereon, and by then causing the heavier particles of the emerging material to descend into a region of greater air supply. We thus utilized the feature of feeding the heavier particles down into a greater air supply at or after leaving the table, as well as in entering the flutes of the table.

We have greatly improved the efficiency of the precipitation of the heavier particles within the flowing mass on the table by certain discoveries hereinafter described, relating to amplitude and frequency of vibration, in combination with predetermined volumes of air supply to the concentrator.

As a result of our invention we are able to obtain separation at a substantially uniform efficiency of recovery averaging in the neighborhood of 98% and not less than 90%. We have accomplished outputs of 100 cubic yards per hour consistently over a table 3 feet wide and at a 98% average efficiency, the material being as high as 8% and higher in moisture. This was not for just a short run but was the average based on a week's operation with the table operating 24 hours a day. In effecting recovery of gold-bearing material where the gold values ran in the neighborhood of twenty-five cents per cubic yard, we have extracted about 4 pounds of gold concentrate per 4-hour run. For material weighing 120 pounds per cubic foot, this is a ratio of extraction or cut of 1 to 324,000; a cut of 1 to 600,000 has also been effected.

We shall now describe a preferred form of our invention, in connection with the following drawings, in which:

Figure 1 is a plan view of apparatus for carrying out our invention;

Figure 2 is a side elevation of the same;

Figure 3 is a longitudinal section of the disintegrating unit shown in Figures 1 and 2;

Figure 4 is a section along the line IV—IV of Figure 3;

Figure 5 is an enlarged side elevation of the concentrator of Figures 1 and 2, showing a coplanar type of vibrating mechanism and connected air control apparatus;

Figure 6 is a somewhat diagrammatic view showing the effect of a coplanar vibrator connected to a table that is flexibly supported and whose angle of inclination is adjustable;

Figure 7 is a top plan view of a concentrator and/or reconcentrator table unit such as may be employed in the layout of Figures 1 and 2;

Figure 8 is an enlarged partial longitudinal horizontal section of Figure 7;

Figure 9 is a side elevation partly in section of the table of Figures 7 and 8;

Figure 10 is an enlarged partial longitudinal vertical section of Figure 9;

Figure 11 is a plan view of a reconcentrator cup unit such as employed in connection with the table of Figures 7 to 10, inclusive;

Figure 12 is a vertical section on the line XII—XII of Figure 11;

Figure 13 is a plan view of a concentrator or reconcentrator system of different end arrangement which will be efficient for treating large volumes of material and will permit the use of thick beds of material on the concentrator table and give good recovery;

Figure 14 is a longitudinal section of a reconcentrator unit taken along line XIV—XIV of Figure 13;

Figure 15 is a sectional view of concentrator taken along lines XV—XV of Figure 13;

Figure 16 is an enlarged sectional detail view of the wedge block system and wedge bars taken along line XVI—XVI of Figure 15;

Figure 17:
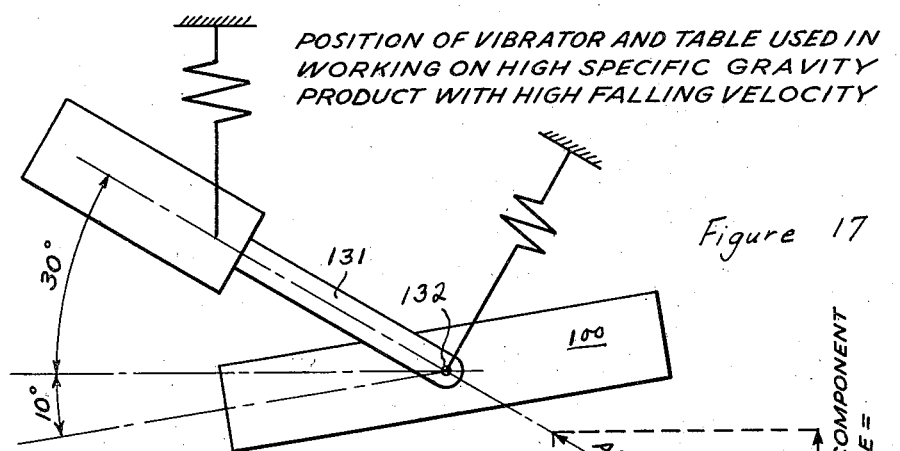
Figure 18:
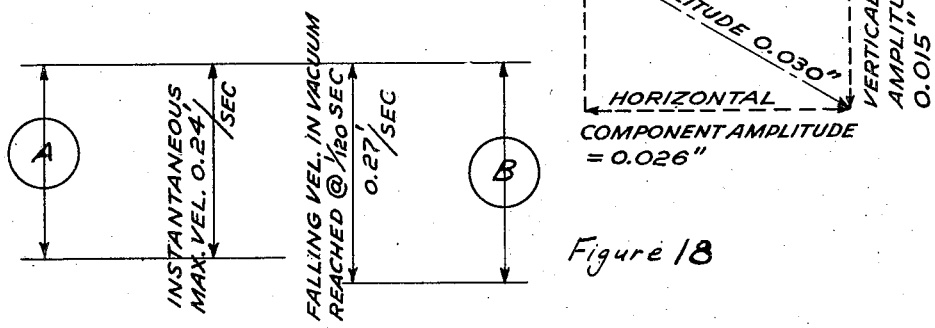
Figure 19:
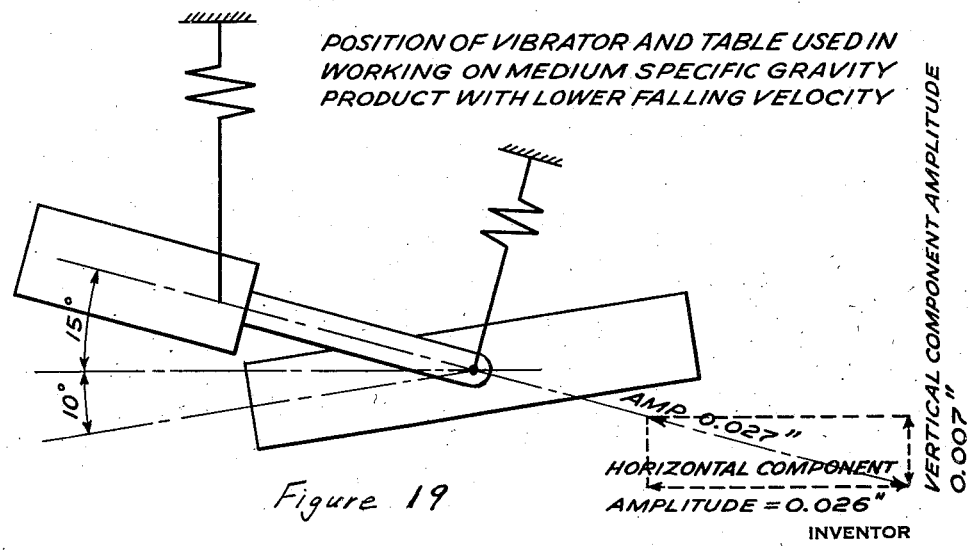

Figures 17 and 18 are somewhat diagrammatic views showing a resolution of the vibrating force into its components, as well as the relationship between the instantaneous maximum velocity of vibration and the falling velocity of the particles that are to be recovered; and Figure 19 is a somewhat diagrammatic view similar to Figure 17 but showing a different angle of application of vibration to the table.

We have carried out our invention in such a manner that aggregate masses may be taken directly from a placer location by a mobile unit and the desired materials separated at such location; or, if desirable, the equipment may be set up in a plant and the aggregate masses shipped thereto.

We have found it advisable in our first step of operation to eliminate large irregular masses such as rocks and boulders, since they would complicate the operation. These boulders seldom contain valuable materials and the desired materials are generally found in particles below a certain size. For these reasons, we first grade or separate out the boulders by some suitable separating means such as a grizzly B, see Figs. 1 and 2, and we prefer a type of rotary grizzly therefor.

In deposits such as found in placer locations, the particles, metals, or stones representing the value content are a very small percentage of the total mass and as previously pointed out, are extremely small in dimension or size. That is, the greater portion of the value content may be below the size of a pinhead, reaching impalpability.

We prefer to remove all materials above 1½" in size. However, we do not limit ourselves to material passing only a 1½" screen, as our equipment has been successfully employed to utilize particles up to those having a 3" dimension. Our preferable operation is, however, in connection with material whose particle sizes run from about 1½" down to an impalpable powder.

In the drawings, A represents placer materials, B represents the grizzly, C represents a hopper unit having two conveyor branches connected in parallel and including a dryer. D represents a disintegrator having a suitable screen apparatus, and E represents a concentrator and/or reconcentrator which feeds into a conveyor from which tailings are dumped at F.

Although our invention deals particularly with dry separation as distinguished from sluice or wet separation, we believe that the disintegration of materials is applicable to wet concentration of desired materials, and may be applied to sluice mining procedures in such manner as to increase the efficiency and to decrease the expense of such a type of operation.

The dry apparatus combined in the unit C is to be employed for drying the materials when they are wet. The hopper of this unit has a fly-gate which diverts the flow either to the dryer or directly to the disintegrator D. At the disintegrator, the remaining conglomerated materials are broken up and delivered from a vibratory screen conveyor into concentrator unit E. The desirable or precious materials are here concentrated and also preferably reconcentrated. The tailings are fed to a conveyor hopper and thence are carried to the tailing pile F.

The grizzly unit, represented by the letter B, is suitably driven by a motor 10, controlled by a rheostat 11, a gear reduction unit 12, and a sprocket and chain connection 13 which in turn drives a bevel pinion 14. The grizzly itself comprises a rotary screen 15, having an inner cylindrical shell 16 and driven by a bevel pinion 14 through the agency of gear wheel 17. The material is fed to the grizzly through a hopper 18. This grizzly may have any suitable construction and may be designed along the lines of any of the commercial types on the market today.

From the grizzly, the materials are brought, by means of a continuous conveyor 19 to the hopper 22 of the unit C. The speed of the conveyor 19 is preferably controlled by a rheostat 21 connected in the line of a driving motor 20. If the material is dry when fed to the hopper 22, fly-gate 23 is in position shown in Figs. 1 and 2, closing off passage to the dryer branch. A continuous conveyor 24 preferably driven by a variable speed motor 25, having a speed control 26, feeds the material from the hopper 22 to an intake or hopper 32 of the disintegrator unit D.

If the material fed to the hopper is wet, the fly-gate 23 is moved to the left of the position shown, to close off feed to the main conveyor 24 and to permit the materials to move along the continuous dryer conveyor 27 to a chute 28, which again feeds the materials to the main conveyor 24. A variable speed motor 29 is preferably belted to the slow speed dryer conveyor 27, and moves it at a speed suitable for accomplishing the necessary drying of the aggregate mass; rheostat 30 controls the speed.

Unit D includes a feed hopper 32, and a disintegrator 31, having a plurality of cylindrical squirrel cages 33 and 34. These squirrel cages, see particularly Figs. 3 and 4, have different diameters and telescope one within the other. In operation, adjacent cages are revolved in opposite directions, as shown in Figure 4. Additional cages, if used, may be mounted on the shafts 35 and 36, respectively. The shafts project at either end of the machine and are driven in opposite directions by belt wheels 37 and 37a. The cages 33—34 are enclosed in a substantially tight casing 38, having an inlet chute or hopper 32 that feeds to the center of the smallest cage 34.

The drive is preferably a variable sheave rope belt drive. The mechanism is operated in such a manner that disintegration takes place substantially by impact. The material fed to the inside of the smallest cage 34 is struck by the moving bars of this cage as it passes outwardly. The bars of the outer cage 33 revolve in the opposite direction and strike blows upon the projected particles. Since no particle follows the same directional path, it is evident that there is a tremendous internal mass impact. Clogging of the mechanism is prevented by a bar 39, projecting from the casing 38, within the smallest cage 34.

The desired function of this unit is to apply intimate concussive impact to all of the masses, so as to disintegrate the conglomerates with a minimum of grinding.

We have discovered that the impact must be intimate with the particles throughout the mass, such as obtained by rubbing with the hands, and that the grinding of the stones and sand is not required. Although the conglomerates are often hard, they are also friable and brittle and may be disintegrated by such concussive impact as obtained by a man rubbing the material between his bare hands.

As shown in Figures 1 and 2, the inner cage 34 is preferably driven through the agency of a rope drive 40 by a variable speed motor 41 controlled by a rheostat 42, and in like manner, the outer cage 33 is driven through a rope drive 43 by a variable speed motor 44 controlled by a rheostat 45.

More or less grinding or more or less disintegration can be realized on this type of machine, not only, as previously indicated, by changing the speed of rotation of the cages and/or by changing the number of cages, but also by varying the distance between the cage bars. Since these bars are removable, bars of lesser diameter or greater diameter may be readily substituted.

After careful investigation and experimentation with changes of speed and changes of other above-mentioned variables, we made a careful analysis of results obtained by microscopic investigation of placer mine samples both before and after treatment. Careful study of specimens of the various screen samples of "run-of-the-bank" and the same material after treatment in the disintegrator or cage mill showed the efficiency of this disintegrator. Screen sizes were studied as follows: plus ¼, plus ⅛, plus 14, plus 28, plus 100, plus 200 and minus 200 mesh. Microscopes of 34 and 100 diameters magnification were used and the conglomerated materials were readily distinguishable before disintegration from the remaining particles in all sizes of screens of the run of bank aggregate. The efficiency of the operation was accurately determined by careful sampling before and after disintegration and we found that we were able to get a predetermined efficiency of 90–98% of disintegration of conglomerated material. These efficiencies are obvious and deducible only from microscopic investigation and are obtained by taking a one-half gram sample of each screening before and after disintegration and physically counting under the microscope the number of conglomerated particles contained in each one-half gram sample of sepcific screen sizes. We are then able to determine the efficiency of disintegration by the reduction in number of conglomerated particles in the specimen prior to and after disintegration.

Evidence of this is given by comparing the screen analysis of a specimen before and after disintegration. The No. 1 sample was a run-of-the-bank aggregate taken from a placer mine, and showed:

| Screen: | Percentage |
|---|---|
| On # 8 | 43.40 |
| On # 14 | 13.15 |
| On # 28 | 17.25 |
| On # 48 | 14.86 |
| On #100 | 6.67 |
| On #200 | 2.81 |
| Through 200 | 1.93 |

The No. 2 sample was the same sample as No. 1 after disintegration in a mill having two cages of approximately 30" diameter and operated at 500 R. P. M. and showed the following:

| Screen: | Percentage |
|---|---|
| On # 8 | 39.74 |
| On # 14 | 16.33 |
| On # 28 | 16.50 |
| On # 48 | 13.24 |
| On #100 | 6.96 |
| On #200 | 4.72 |
| Through 200 | 2.34 |

We accomplish disintegration of conglomerated material by the mechanical application of concussive impact that is intimate throughout the mass of the aggregate and that is applied in such a manner as not to require grinding or pulverization of large size pieces. Of course, in certain localities and in rainy seasons it may be desirable to use roasters or rotary driers of well known construction, or other means of drying the aggregate.

In the preferred form of our procedure, we have shown in Figures 1 and 2 vibrating screen conveyors connected with the outlet of the disintegrator unit D and connected with the inlet of the concentrator unit E. Both of these mechanisms may be of any suitable type such as now employed for vibrating screen (regrading) action. The one vibrating screen is represented by the numeral 46 and the other is represented by the numeral 47. The sceens 46 and 47 aid in further eliminating undesired materials of a size above that at which the concentrator unit E will most efficiently operate. Preferably the mesh of the screens 46 and 47 is so selected that particles entering the concentrator unit E are of such a size that they will all pass a #4 (four) Tyler screen.

The materials fed from the screen 47 enter a concentrator unit such as shown in Figures 5, 7, 8, 9, and 10. This unit includes a bed so controlled and operated that high specific gravity materials are separated or concentrated from the lower specific gravity materials. Separation is effected by the application of controlled amplitude, frequency, and direction of vibration to dry air flotation of the selected materials.

When we use the term "apparent flotation," we mean that when viewed by the naked eye, the mass of the material appears to be in flotation. In other words, the mass simulates a liquid body having particles therein of different specific gravities. By tests we proved that a suitable floating effect could be accomplished by providing a sufficient volume of air through the bed while preferably subjecting the bed to vibrating forces having a vertical component. Movement of the material over the bed is effected by inclining it and by providing the vibrating action upon the bed of such a type that a horizontal force component is available. We employ the vertical force component to decrease what may be termed the simulated viscosity of the materials, and particularly those above the bed. The horizontal component is available to decrease the viscosity of the particles of the value content that are contained in the flutes or riffles to thus prevent damming and to increase the efficiency and rate of run-off.

When intermittent operation is used, the flutes or grooves may extend at any angle. In such case, for example, when the flutes were filled to proper capacity with the heavier particles, the feed to the bed would be stopped while the table operation would be continued until the material treated has passed off the bed, leaving only the concentrates in the flutes. This would then be removed and operations resumed.

But for continuous operation, the flutes should extend at less than right angles to the direction of flow of the material over the bed. In other words, the material should move along the flutes in a forward direction.

When all or part of these flutes are cut at less than 90° to the path of flow on the bed, the materials in the flutes will receive a component of force or energy from the vibrating element, permitting said heavier specific gravity materials, along with some lighter material, to travel along the flutes or grooves to a receiving channel or channels and then from the receiving channel or channels to reconcentrator units. Although the reconcentration is not absolutely necessary, it is preferable, since very fine materials are thus recovered, and the separation is accomplished to a much greater extent of effectiveness.

We also determine that the control of air as well as the control of the amplitude and frequency of vibration of the table should be capable of wide variations, in order to take care of different specific gravity materials, aggregates having different proportions of materials, aggregates having entrained moisture and other variables which will appear to those skilled in the art.

As shown particularly in Figure 5, a main concentrator unit 100 is provided with an air chamber below its bed portion 101, to which air is supplied by means of a blower 52 and line 53. The control of the volume and pressure of the air supplied to a wind box or chamber 100' is accomplished by throttle valve 55 or a variable speed motor 56 controlled by a rheostat 57, as shown in Figure 1. In a similar manner, a blower 58 whose speed is controlled by a motor 59 and rheostat 60, supplies air of desired pressure and volume to each reconcentrator cup or unit through conduits 61 and 62. Each conduit is supplied with a throttle valve 63 and 64, respectively (Figure 5).

The vibration of the table or bed is preferably accomplished by a co-planar or straight-line type of vibrator such as shown in Figure 5 and designated by the numeral 65, shown as flexibly and adjustably suspended at 66 and provided with what may be termed axial-joint means for connecting it to the center of gravity of the table and bed combination at the point as shown by the numeral 67 in Figures 2 and 5, and 132 in Figures 7 and 9. In other words, the vibrating element or arm is connected to the frame solely at this point; it is preferably mounted in such a manner that it can be pivoted or turned about the joint to vary the angular relationship or setting between the frame and the vibrator element. The coplanar vibrator may be of the well known Jeffrey type. The concentrator table is, in effect, carried by the joint 67 or 132 of the vibrator elements or arms.

As previously pointed out, and as shown in Figure 2, we may also provide a vibrating type of conveyor mechanism 46 which also acts as a screen for delivering the materials from the disintegrator unit D, and may also provide a conveyor unit 47 of the same type for delivering the material received from the conveyor 46 to the concentrator unit E. The conveyors 46 and 47 may be of the Jeffrey type which are well known.

The concentrator table 100, see Figures 7 and 9, comprises a skeleton frame 101 having diagonal corner tubes 102 rigidly secured under the four corners thereof for strengthening it. Suitable filter blocks of rectangular form 103, for example, of about 40 permeability, are shown on the frame 101. Each of the blocks is cemented to adjacent or abutting blocks preferably with a rubber cement to seal off the cracks therebetween and form a unitary permeable or porous bed that is supported at spaced locations along its bottom face and at one end upon the frame 101. The individual blocks or separate portions of the porous bed are, in effect, resiliently connected together and yieldably and forcibly held against substantially rigid casings 108 of the frame 101 by block wedging bars 104 that extend transversely of each block and are secured by tension springs 105 to vertical bars 106.

Although a filter type of block is preferred due to its properties of diffusing the gaseous fluid which is introduced therethrough, the invention is not limited to the employment of a particular size or shape of permeable members or portions. That is, we preferably provide a bed of permeable or porous material of suitable lateral and longitudinal dimension that is, in effect, yieldably or flotatably mounted while at the same time is operably connected by suitable means to a relatively non-yielding or rigid vibrating element or connection in such a manner that vibrations will be imparted to the bed without substantial loss or dampening of those vibrations and without damage to the bed.

The vertical bars 106 are held in position by cotter pins 107 in a U-shaped casing 108 secured to the framework 101. The blocks 103 are also yieldably and forcibly held against an abutment of frame 101 along a plane of the bed by compression springs 109. These springs are particularly shown in Figures 7 and 9 and are adapted at one end to abut wedge bars 110, which in turn abut the front edges of the block assembly 103. Each spring is supported on a removable bolt member 111 which is rigidly supported upon a U-shaped bracket extending from the front edge of the bed frame 101. Rear edges of block assembly 103 abut special wedge bar 104a rigidly attached to framework 101 as shown in Figure 10.

Where relatively high frequency vibration such as contemplated herein is to be applied to the table, for example, in the neighborhood of 2100 cycles or above, it must be so constructed as to resist a force of at least seventeen times its weight in its upward and downward movement between cycles. In order to gain the greatest efficiency of apparent flotation, it is also desirable that as the aggregate passes in apparent flotation over the air diffusing medium, its flow will be unobstructed and that there be no dead spots (places where the upward travel of air is obstructed). By means of the above described construction, we have provided the necessary operating connection between the permeable bed and the vibrating arm or element so that there is substantially no loss of vibration or dampening of the vibration as applied to the bed; all dead spots are eliminated and the bed provides an unobstructed surface so that the aggregate in apparent flotation can quickly and easily seek its level. Furthermore, as above described, we use a rubber cement or its like to fill the joints between the blocks of the diffusing medium, thereby providing a satisfactory resistance to the escape of air at these locations, but making it practicable to replace readily and easily any of the blocks 103 that might be worn or damaged.

Another advantage of this construction is, that in comparison to the usual bolted or welded metal tables, it provides a means of materially reducing the weight of the table, thereby permitting efficient operation by a much smaller vibrator. That this is an important factor in this design will be appreciated when it is pointed out that where electrical vibrators are used, the mass weight of the vibrator must be 5 (five) times that of the unit it is to vibrate. Every 100 pounds of weight reduction in the table 100, Figures 7 and 9, means 500 pounds less that is required in the vibrator. As a further means of reducing the weight for the wind-box 100', Figure 9, we prefer a latex treated canvas or other lightweight strong material that is impervious to the passing of air.

In Figures 7 and 8, we show grooves 112 extending somewhat in the direction of movement of the material and transversely or across the block assembly 103 to a pair of oppositely-located main or side grooves, channels, or flutes 113. From the side flutes 113, the material is moved forward toward the reconcentrator units. The undesired material on the bed 103 is in like manner moved forward and dumped from the apron 114, see particularly Figures 7 and 8.

Although it may not in certain cases be necessary to provide reconcentrator units, these units are preferable when fine or flour-like gold particles or particles of other precious minerals are to be recovered. For this purpose, the guide channels 113 at each side of the unit 100 lead to separate and opposite reconcentrating units. These units are particularly illustrated in Figures 8, 9, and 10. The material fed from each groove 113 enters its reconcentrator unit on a screen preferably of wire, designated by the numeral 115. This screen is removably mounted upon a support guide structure 116 secured to the framework 101. The very fine particles thus fall through this screen into the chamber 117 and from the chamber into a reconcentrator cup casing 118 which is open at its top, see particularly Figure 10.

The larger materials move to the end of the screen 115 and pass downwardly along a chute 119 to a second reconcentrating unit 118'. It will thus be seen that the first unit collects the flour-like particles and the second unit 118' collects the balance or larger particles of the desired materials.

Like the permeable blocks, the screen 115 is preferably resiliently mounted on the framework structure shown. It is provided with a suitable spring pin 120, a compression spring 121, adjustable mount lugs 122, and a guide bar member 123 which guides the movement of the screen and is removably held in place by a nut 124. The undesired materials are carried past the reconcentrator units 118 and 118' and are fed outwardly through a discharge chute 125.

It will be understood from the above description that in order for the heavier specific gravity material within the flutes to reach the reconcentrating cups, it must travel within the flutes or grooves by reason of the energy imparted to the particles either by gravity or the component of force received from the vibration, or both, into the main channels 113, at which point the materials concentrated within the flutes assume a direction similar to the path of the total aggregate passing over the bed, thence to the reconcentrating cups. At the point where these main channels 113 meet the entrance to the reconcentrating cups, apron 114, Figures 7, 8, 9, and 10, is provided to skim off, at or slightly above the level of the top of the main channels 113 the lighter specific gravity materials of the main aggregate passing over these channels, from the heavier specific gravity materials within the main channels. This is done so that there will not be a remixing within the reconcentrating units of the materials already separated.

The table discharge system just described will operate efficiently on low tonnage and with a thin bed of material passing over it. It may also be operated intermittently.

In Figures 13, 14, and 15, we show an improved and preferred form of concentrator table and discharge system which will operate efficiently with large tonnage and a thick bed of material treated thereon and may be used in a continuous type of operation.

The difference between the preferred form of concentrator table shown in Figures 13, 14, and 15, and the modified form shown, for example, in Figures 7–12, inclusive, can be better understood by comparing Figure 7 with Figure 13. The difference rests particularly in the shape, design, and cutting of the integral flutes and the location of the reconcentrator cups. The location of the reconcentrator cups in the preferred embodiment of our invention requires the heavy specific gravity material that is trapped in the flutes to pass out through the sides of the bed directly into the reconcentrators rather than to pass off the ends of the bed where the reconcentrating cups are located in the modified embodiment. Of course, it will be apparent that the uni-directional vibratory effects can be employed in both forms of our invention.

In this case, the flutes 112a extend from the sides to a central longitudinal flute 113a. At its forward end flute 113a connects to flutes 200 which extend to the sides of the table. Between their lower ends we show a trap 201 at right angles to the flow of material and which has no automatic discharge. The flutes 200 lead to registering openings 212 in the sides of the bed of the same size as the flutes, each discharging into its reconcentrating unit, shown in Figure 14. These reconcentrating units are bolted to the table and hence receive the same vibration. Each has a permeable block 202 with its upper surface in the plane of the bottom of flute 200. 203 is an adjustable stop. From 202 the concentrate passes along onto permeable block 204, both blocks having air supply 205 to an air jacket 206. Block 204 is preferably shaped as shown so that as the heavier material of the concentrate descends from the upper level, a larger volume of air is supplied. Transverse grooves 207 permit the very fine flour gold to be trapped at a region where less air is received. Thence the heavier material descends again into a heavier air supply at 208. Sufficient air to this unit is supplied to keep the lighter materials in apparent flotation so that they pass out of the reconcentrator at 209 (Figure 14) which is at or below the level of flute floor 200.

We thus remove the flute concentrates from the table without using a mechanical skimmer and without retarding or damming back any material on the bed. Also we avoid remixing after such removal by the increased air supply in the descending portions of heavier particles within the reconcentrator. At suitable intervals the block 204 with its casting support 211 is taken out by detachable support 210 and is replaced by an empty one. During this momentary operation gate 203 is closed to stop the feed to this reconcentrator at registering opening 212. During this short intermission, the bed operation proceeds and is not affected in its general efficiency. As shown in Figure 15, the top of the main supporting channel of the bed is at the same level as the bottom of the flutes 200 and hence, the outlet hole 212 is merely cut through the overlying angle 213. 214 is a rubber gasket to prevent air leakage.

Unit 100, see for example, Figures 9 and 15, is preferably provided with a top frame structure 126, secured to the framework 101 and having suitable reinforcing 127 and 128. It is shown as inclining towards the entering end and is open at its top to permit the material to be readily fed. It is cross-supported by suitable pipes or tubular members 129. A cable support 129a makes it possible to adjust the table to any desired angle or direction of inclination to the horizontal, for example. Suitable angle bars 130 have also been provided adjacent each side for further strengthening the top frame. Of course, it is apparent that the angular relationship between the vibrator arm or element 131 and the table 100 will be adjusted by loosening the connections 132 and moving the arm about the axis joint.

For co-planar or straight-line agitation of the unit 100, as previously intimated, the connector or vibrating support arm 131 is provided and is adjustably clamped for pivot adjustment by a suitable structure such as provided by bolt and stud means 132. In effect, the arm 131 is axis-connected to the frame and bed combination through their unit center of gravity; by "axis-connected," we have reference to a sole connection about which the arm can transmit its vibrations to the table. It is apparent that this connection may extend through the table if desired, or separate end portions provided.

We also preferably individually control the supply, in other words, volume and pressure, of the air supplied to each of the reconcentrator units 118 and 118'. This has been previously explained in connection with the description of Figure 5. The air lines 61 and 62 enter their reconcentrator units through pipes 61' and 62' respectively. Each reconcentrator cup of the embodiment of our invention shown particularly in Figures 11 and 12 includes a casing 135 of generally rectangular form having an open top; permeable blocks 136 are mounted adjacent the bottom thereof by means of set screws 137 and screws 138. The set screws 137 extend from the sides of the casing and the cap screws 138 extend upwardly from the bottom flanges of the casing. The permeable block 136 is preferably stepped as shown, in order that the desired material may be fed through a plug valve 139 and a removable cup sleeve 140 to a glass jar or collecting cup 141.

The permeable block also divides the reconcentrator unit into upper and lower chamber portions, and the air is supplied to the lower chamber portion, as previously explained, and is passed upwardly through the permeable blocks to accomplish the concentrating action.

We have shown a suitable sight frame structure, by which an operator may view the inside of the reconcentrator from the side thereof. This sight structure includes a sight frame 142, and a machine screw 143 which mounts it on the casing of the reconcentrator unit by means of a clamp plate 144. Each sight is provided with a plate glass window 145 and a snap ring 146 for holding the glass in place.

A vertically extending plate 147, Figures 11 and 12, projects downwardly in front of the opening to the jar-proof valve 139 to act as a dam and prevent entrance of materials other than those desired. This dam 147 is secured to the framework by rivets 148. Each reconcentrating unit 118 is removably secured to the feed channel of the main unit 100 by threaded studs 150, which are also provided with nuts 151 and cotter pins 152 for holding them in a tight relationship with respect to the framework of the main unit.

A delivery valve 139 is provided with a shaft 153 held in a removable relationship in a plug casing 154 by a hexagonal nut 155, and a cotter pin 156. A cam collar 157 is keyed to shaft 153 and cooperates with a stop pin 158 to limit the extremes of movement of the valve 139. At the other end, the valve rod is provided with a wrench flat 159 to receive a turn-arm, and is also provided with a collar 160 which is resiliently held in place by a ball 161 and a compression spring 162.

The volume and pressure of the air required for practical operation depends upon the material used as the diffuser plate for the bed of the concentrator and reconcentrator units, upon the thickness of the material passing over the bed, and upon the character of the material being handled and the length of the bed, and in other words, the time provided for separation. We have found that as a lower limit 30 cu. ft. of air per minute per sq. ft. of bed surface for ordinary run of aggregates, and as an upper limit, substantially 150 cu. ft. of air per minute. Of course, the character of the diffuser as well as the thickness and the character of the porous material of which the bed is formed, and the character of the vibration will control the pressure required at any given time.

In Figure 6, we have shown a co-planar type of electrical vibrating mechanism, such as 65 of Figure 5, diagrammatically applied to a concentrating and/or reconcentrating unit 100 such as illustrated in Figures 7 to 12, inclusive. Although the table 100 is shown with an inclination, this is not necessary in that the vibration itself causes the particles to move in the path indicated by the dotted lines. However, we prefer to position our table 100 in such manner that it may be tilted from an angle of zero to 15°, see the angle indicated by the letter $e$. The axis of application of the vibration indicated by the letter $d$ is preferably adjustable. The vibrator element is preferably connected at an angle to the bed such that the horizontal component of the amplitude of vibration will tend to advance the particles in the same direction as they would be advanced by gravity force such as produced by an inclination of the bed. The angle of application is preferably an acute angle in order to provide both vertical and horizontal components. The arrows $a$ and $b$ indicate paths of travel of the points $a$ and $b$ of the table 100.

As previously pointed out, the angle of inclination of the concentrator and/or reconcentrator table unit 100 is varied by the cable means 129$a$, see Figure 9. The cable support 129$a$ is fastened to a cable which, in turn, is fastened to a support by a spring (see Figure 6) in order to effect a maximum of dampening action between the suspension and the support.

As previously indicated, a co-planar electric motor type of vibrator may be successfully employed in carrying out our process. In such a case, the frequency may be controlled by a suitable frequency change unit inserted in parallel with the input to the vibratory motor. The amplitude of the vibration or, in other words, the length of the stroke, is varied by changing the current supplied to the motor; a rheostat control is suitable in this connection.

We prefer controlled directional vibration such as produced by a coplanar electric motor mechanism. Although mechanical limitations may prevent the use of especially high frequencies, we have successfully employed a frequency of 4000 cycles per minute and have definitely determined that the vibratory action increases in efficiency with higher frequencies. We have also found that the lower limit for practical operation is above 1000 cycles per minute, preferably 2100 cycles or above.

For a frequency of substantially 3600 cycles, we have varied the amplitude control from zero inches to .08" and have found that a practical range of operation is between .001" and .25", and preferably the range is between .010 and .030 for materials normally encountered in placer mine operations.

We also control the direction from which the vibration is applied and apply it in such a manner that it aids in the pneumatic or air flotation of the aggregate mass. The bed is also preferably designed in such a maner that the angle of incidence for the application of the vibration may be of a predetermined angle which will give the greatest efficiency for particles having certain definite differences of specific gravity.

Although it is possible to construct the integral riffles or flutes in our bed at right angles to the flow of material, and to trap the concentrates in this manner, we prefer so to construct the bed that the flutes or riffles are at an angle of less than 90° with respect to the direction of flow of the material. If the flutes are made at an angle of less than 90°, then the horizontal component of vibration effectively advances the material in the flutes therealong in such a manner that the concentrates, including black sand, may be drawn off to the side or sides of the bed without the movement of the material in the flutes being stopped. This eliminates the danger of packing and blocking which often causes difficulties in wet processes due to the presence of the black sand or hematite. The angle of the flutes will be determined to a large extent by the anticipated percentage of material to be recovered and in any event by the speed of the flow desired in the flutes. As the angles approaches 90°, the speed of flow, of course, is reduced. However, we found that the angle of the flute may vary from 0° to a value approaching 90° in the direction of flow of the free material. In some cases, we prefer to have adjacent or near the discharge of the bed a flute at 90° to the main axes of flow of the material to act as a final trap on the table.

The limit of the amount of air increase in the riffles or flutes is dependent upon the specific gravity, size or dimension and particle shape of the materials to be recovered. In the apparatus shown in Figures 7 to 10, inclusive, the increase may be automatically provided for by cutting the flutes or grooves to a greater or lesser depth in the porous block.

The flutes are also located so that the material will advance along them either to a discharge chute or to a reconcentrator unit for further separation. If the table is maintained in a horizontal plane, then the vibration is the only force producing travel of the particles. In order to increase the tonnage and to assist the vibration, we prefer to suspend the bed so that its angle or tilt may be changed as desired.

We have determined, as previously intimated, that in order to hold the non-value content or particles of the materials in suspension, a suitable relationship must be maintained between the velocity and amplitude of vibration and the falling velocity of desired particles for their particular specific gravity or gravities.

At a frequency of 2100 cycles per minute, a particle would theoretically have a chance to drop almost .04 of an inch during a half cycle, while the table was receding or going down, but only to drop a little over .01 of an inch at 3600 cycles per minute. Of course, due to the rising air stream, no particle drops these distances, but the approach is close in the case of small heavy specific gravity particles and less close in the case of large specific gravity particles, and not at all close in the case of low specific gravity particles, which, of course, make up the majority of the mass undergoing treatment.

If the table was maintained in a vacuum, it would be necessary to choose an amplitude and frequency combination to provide a vertical component for the amplitude and frequency combination such that the maximum instantaneous table velocity would be greater than the particle velocity due to gravity during substantially half a cycle of vibration. The material being concentrated is to be activated in such a manner as to distribute the vibrations throughout the entire level of the particles, avoiding producing what may be termed pockets. For differential flow of the fluid through the porous bed, particularly where grooves are employed, the bed should have a suitable thickness. Various types of materials can be employed such as silica sand bonded together or aluminum oxide particles bonded together. The present invention is not limited to a particular type of block construction nor to a particular size or shape of block or bed portions. Although we prefer a filter type of bed having diffusing qualities as far as a gaseous fluid is concerned, other suitable types may be employed. When we speak of permeability of the bed, we speak of the number of cubic feet of air per minute that at standard conditions will pass through one square foot of surface one inch thick at a hydrostatic pressure of two inches of water.

The vibrating element or elements preferably have no intermediate connection between the unit center of gravity of the bed and table combination and the point of vibration initiation. The section of the element is preferably symmetrical in all planes about a central axis. An I-beam is a good example of such a type of section.

Since the rising air current has comparatively small supporting effect on the small heavy specific gravity particles, it was found that efficient flotation of low specific gravity particles and the settling of heavy specific gravity particles became most effective at the points of table velocity, frequency, and amplitude indicated herein, regardless of air volume or velocity. At table velocities below these, the aggregate bed was dead no matter how much air was furnished. On the other hand, where heavy amplitude and high frequency combined to give a maximum instantaneous velocity much greater than the velocity of fall through a half cycle of vibration, one of two phenomena occurred. In the case of low air velocity, tossing of the particles resulted due to its being a unit mass. In other words, the particles were not separated by the air. In the case of high air velocity sufficient to separate the particles, the heavy specific gravity particles which had stratified to the table surface as desired, tended to be projected violently into the moving mass.

As will be noted from the drawings, see Figure 9, the compression springs 109 which are mounted substantially in the plane of the bed, and the tension springs 105 which are mounted beneath and at substantially right angles to the plane of the bed, all contact the bed structure in an endwise manner and are all operably connected endwise between the bed and the support structure. Thus, when we speak of "endo" (taken from the Greek meaning end) spring support means, we have reference to a spring support means that is connected and will thus operate in the above manner. It is this mount construction which makes possible the successful vibration of the porous bed construction at a high frequency that may be substantially over 1,000 or 1,500 cycles. It protects the bed from a force that may equal seventeen times the weight of each block, as previously pointed out herein. These springs are suitably "pre-stressed."

It will thus appear that an important feature of the present invention is the provision of yieldable means for urging the permeable portions of the bed in a forcible manner towards the vibrating frame. The relationship between the bed and the frame is thus such that both vertical and horizontal components of the vibrating force are effectively transmitted to the bed and a loss or dampening of vibration is prevented. The yieldable construction is such that the bed is, in effect, flotatably or yieldably mounted to increase its strength as far as forces tending to fracture it are concerned; however, there is obtained what may be termed a rigid operating relationship or connection between the vibrating element and the bed as far as an effective non-dampened transmission of vibration to the bed is concerned.

The means provided by the wedge 104 and the springs 105 yieldably and forcibly urges the permeable portions of the bed towards the rigid casing members 106, and thus, in effect, yieldably holds the permeable portions of the bed in position. The springs 109 force end portions of the bed against the end plates of the frame, and thus, in effect, yieldably force or urge the permeable portions of the bed towards each other against any separating forces.

We thus so control the velocity of air and the combination of frequency, amplitude, and direction of vibration, in order that the velocity of all of heavy specific gravity particles due to gravity and air flotation through a half cycle of vibration will approach the vertical component of the instantaneous maximum velocity of the table and bed combination due to vibration, and thus cause the heavy particles to fall and remain on the table surface. The velocities of the low specific gravity material will be below the maximum instantaneous velocities of the table or bed and will thus cause them to remain in suspension, or if they reach the table to be reprojected back into the moving mass.

The falling velocity of a particle through a fluid or simulated fluid is dependent upon the particle's specific gravity. We have determined that the velocities of the particle attained in air approached very closely those that would be attained in a vacuum. The particles of the value content which are to be recovered, of course, never reach terminal velocity because it takes at least twenty seconds and the time is only one-twentieth of a second before the particle contacts the bed. We know that for a certain instantaneous maximum table velocity as determined by the operating frequency and vertical component of amplitude, we get the most efficient and rapid separation for the material and the value content thereof. For gold separation, for example, a vertical component of amplitude of .015″ gives a very efficient operation with a frequency of 3600 cycles per minute, and gives an instantaneous vertical component of about .24 ft. per second. The falling velocity attained by a particle in vacuum during $\frac{1}{120}$ of a second (equivalent to a half cycle of frequency), which is the time spent by the table or bed in receding through a vibration, is .27 ft. per second. The optimum results are obtained when the free falling velocity attained by a particle of the value content approaches but is always greater than the instantaneous maximum velocity of the table, in other words, .24 vs. .27. Due to a proper selection of amplitude, frequency, and vertical vibration component variables given to the table to approximately match the falling velocity during a half cycle of frequency for the particular particle being separated, that particular particle stays practically quiescent on the table surface except as it may be conveyed along the same by the influence of gravity or of the horizontal component of vibrations.

The vertical component of instantaneous maximum velocity should approach the falling velocity of the value particle as closely as possible without exceeding it in order to impart an intense vibrative effect to the particles passing over the table; this inter-particle bombardment and impact is an important causative effect for decreasing viscosity of this simulated liquid. As previously pointed out, the horizontal component of vibration, in addition to its conveying function, assists in breaking down viscosity especially in the neighborhood of a vertical surface such as exists in the flutes; here, diminution of viscosity is even greater than at other points on the bed surface with corresponding increased efficiency of fall of the heavy specific gravity particles into the collectors which may be flutes or riffles.

In this connection, particular attention is called to the diagrammatic sketches of Figures 17–19, inclusive. Figure 17 shows conditions producing an instantaneous maximum vertical component of table velocity of .24 ft. per second. Since the vibration is substantially harmonic (the production of a point traveling in a circle) the instantaneous maximum vertical component of table velocity for 60 cycles per second is $$\frac{.015 \times \pi \times 60}{12}$$

or .24 ft. per second, represented as vector A in its vertical position. Referring to Figure 18, the falling velocity of a particle in a vacuum during a half cycle of frequency (for 60 cycles per second, this is $\frac{1}{120}$ of a second) is acceleration of gravity multiplied by time, viz., $V=at$, or $$32.2 \times \frac{1}{120}$$

or .27 ft. per second, see vector B in the figure. As pointed out above, the vector A should be as large as possible but always less than B.

In Figure 19, we have diagrammatically illustrated the force components of the vibratory action to illustrate the change effected by a change of 15° in the angle of application. The vertical component of instantaneous velocity for the above setting will be $$\frac{.007 \times \pi \times 60}{12}$$

or .11 ft. per second. This would then be used on value content particles whose falling velocity due to medium specific gravity is relatively low— in the neighborhood but greater than .11 ft. per second. It should be noted that the horizontal component of amplitude remains the same as in the case represented in Figures 17 and 18. As previously pointed out, an efficient vertical component of amplitude at 3600 cycles per minute for gold particles whose specific gravity is generally about 15 to 19 is found to be .015″. For other value contents of lower specific gravity that would tend to stay in flotation for this particular amplitude and frequency combination, we choose a lower vertical component of amplitude to give a lower vertical component of maximum instantaneous velocity more nearly approaching but of course not equaling the lower velocity of fall attained by such lower specific gravity particles; for example, certain iron ores have a specific gravity of around 5 as compared to the specific gravity of gold of 19 and require vertical amplitudes in the neighborhood of .005″; horizontal components of vibration were necessarily of substantially the same degrees as for gold. Hence the angle of application of the vibrating element to the table has to be flattened.

The following analogy is of interest: when a handful of sawdust and lead shot is thrown into a bucket of water, the shot immediately sinks due to its relatively high specific gravity and to the lower relative viscosity of the water as well as due to the fact that the water is intermediate in specific gravity to the shot and to the floating sawdust. Now, had the same handful of sawdust and shot been thrown into a bucket of molasses, the shot would sink to the bottom after a considerable time, the larger portions arriving first, while the sawdust would continue to float. Separation will be effected but it may take three days instead of half a second. We have been able to produce on our vibrating table with its rising fluid a condition of simulated liquefaction in the materials being treated of almost any intermediate specific gravity, and are also able to lower the viscosity of this simulated liquid and thus effect a quick positive separation.

The function of the rising gaseous fluid in combination with the vertical component of amplitude of vibration is to cause apparent flotation or simulated liquefaction of the material with a consequent segregation of the high specific gravity particles towards the table or bed surface. Successful operation is effected by a correct correlation of frequency, amplitude, and direction of vibration, velocity and volume of rising fluid, to produce a resultant high volume of output. As will be apparent from the previous explanation, the following variables in the material being treated influence the above operating relationships for efficient operation: specific gravity of the material or aggregate, specific gravity of the value content to be recovered, degree of dampness of the aggregate material, size or shape characteristics of the aggregate material as well as of the value content, and the degree of inter-particle adhesion and stickiness. Also, as above intimated, the specific gravity of the particles to be recovered must be greater than the specific gravity of the undesired materials, and the specific gravity of the simulated liquid should be intermediate between the specific gravities of the two. We have employed a frequency of 7000 cycles for certain types of value contents.

As previously pointed out and as particularly shown in Figure 9, the permeable portions of the bed are, in effect, held in a relatively non-yielding-vibration-transmitting association with the vibrating element or frame in such a manner as to prevent a substantial dampening of vibrations therebetween. In other words, the porous portions of the bed are held against or in contact with vibrating portions (frame) of the table without any resilient or yielding means being interposed therebetween. However, during actual operation when the table or bed is being activated by the vibratory action of the frame, it will be substantially floatably positioned due to the resiliency of the connecting springs 109 and 105 that normally tend to forcibly urge the bed towards the frame.

While we have shown an application of our invention and have set forth factors of importance in carrying it out as applied to dry separation, it will be apparent that many changes, modifications, substitutions, additions, adaptations, and omissions or combinations thereof may be made without departing from the spirit and scope of the invention as indicated in the appended claims.

This application is a continuation-in-part of our copending application Serial No. 110,626, filed November 13, 1936, entitled "Procedure for recovery of desired materials from aggregates."

We claim:

1. In a specific gravity concentrating apparatus for obtaining values from aggregate or mass materials, the combination with a vibrating frame of a bed having permeable portions over which the materials are to be advanced, collector means operably associated with said bed, means operably connecting separate permeable portions of said bed together, and yieldable means connected with said operably connecting means and forcibly urging said bed towards said vibrating frame into an effective vibration-transmitting relationship therewith.

2. In a concentrating apparatus for obtaining values from aggregate or mass materials, the combination with a vibrating frame of a bed comprising permeable portions over which the materials are to be advanced, wedge means interposed between separate permeable portions, and means operably connected to said wedge means for yieldably urging the bed towards said vibrating frame.

3. In a specific gravity concentrator apparatus for obtaining values from aggregate or mass materials, a frame, a permeable bed supported on said frame and having fluid-diffusing thickness portions, flutes or riffles extending along the bed substantially transversely of the path of movement of materials with respect to the bed, vibrator means having a straight-line actuating element constructed and arranged and having an axial-joint connection solely at the center of gravity of said frame and bed combination such as to provide straight-line unidirectional movement-producing vibration of said bed, and means applying a fluid through said permeable bed to aid in effecting an apparent flotation of the materials.

4. In a concentrator apparatus for obtaining values from aggregate or mass materials, a frame, a permeable bed supported on said frame and having fluid-diffusing thickness portion, transversely-extending flutes or riffles along said bed, vibrator means having a straight-line actuating element constructed and arranged and having an axial-joint connection to said frame at the center of gravity of said frame and bed combination such as to provide straight-line uni-directional movement-producing vibration of said bed, means yieldably connecting said bed to forcibly urge it towards said frame in such a manner as to prevent a dampening of vibrations therebetween, and means applying a fluid through said permeable bed to aid in effecting an apparent flotation of the materials.

5. In a concentrating apparatus for obtaining values from aggregate or mass materials, the combination of a bed construction having permeable portions, transversely-extending riffle grooves in said permeable portions, at least one longitudinally-extending groove in said bed connected to said transversely-extending grooves, a vibrator having a straight-line actuating element and having an axial joint connection at the center of gravity of said bed construction in such a manner as to produce a straight-line unidirectional movement-producing vibration of said permeable portions, said vibrating element being angularly adjustable with respect to said permeable portions, and means for preventing a dampening or loss of vibration between said permeable portions and said vibrating element, and an air chamber supplying air to a side of said permeable portions for floating materials thereon.

6. In a concentrator as defined in claim 5, a reconcentrator unit operably connected to said bed construction for vibration therewith, and operably connected with said longitudinal groove for receiving materials therefrom.

7. In a specific gravity concentrating apparatus for obtaining values from aggregate or mass materials, the combination of a permeable concentrating bed over which the materials are to be passed, flutes or riffles operably associated with said bed, vibrator means having a vibrating element, said vibrating element being operably and solely axial connected to said bed at its center of gravity and setting up a vertical force component in said bed closely approaching and not equaling the falling velocity attained by particles of the value content in vacuum during a half cycle of vibration of said bed.

8. A method of obtaining values from an aggregate, comprising the steps of placing the aggregate on a table having a porous bed provided with fluid-diffusing thickness portion, subjecting the aggregate through the porous bed to gaseous fluid flotation, applying straight-line vibration to the bed solely at the center of gravity thereof and to the aggregate thereon at an angle thereto and at a frequency of at least 2,100 cycles per minute with a suitable velocity and an amplitude of not more than substantially .05 inch, thereby floating lighter specific gravity materials above the table and collecting heavier specific gravity materials constituting the values on the table without reprojection.

9. A method of obtaining desired values of greater specific gravity from an aggregate of lesser specific gravity, comprising the steps of feeding the aggregate containing the values forwardly in a layer over a supporting bed having fluid-diffusing thickness portions and having collecting flutes or riffles, subjecting the layer to flotation action of a gaseous fluid, imparting a straight-line vibration substantially uniformly to the bed at an acuate angle thereto and solely at the center of gravity thereof, and collecting values in windrows at the flutes or riffles.

10. In a specific gravity concentrating apparatus for obtaining values from aggregate or mass materials, the combination of a bed having permeable portions, flutes or riffles operably associated with said bed for collecting value materials, vibrator means for activating said bed, a wedge-shaped member extending along an end portion of said bed in abutment therewith, and spring means operably connected to said vibrating means and being operably associated with said member to forcibly urge it against said bed in a direction to force said bed into effective vibration-transmitting abutment with said vibrating means.

11. In a specific gravity concentrating apparatus for obtaining values from aggregate or mass materials, the combination of a permeable bed having fluid-diffusing thickness portions along which the materials are to be advanced, flutes or riffles operably associated with said bed, a vibrating frame for activating said bed, means interposed between said thickness portions in wedging engagement therewith, and yieldable means connected to said interposed means to exert a compressive force in a plane of the bed to compress the thickness portions of said bed and to urge them with a predetermined force towards said vibrating frame and into an effective vibration-transmitting relation therewith.

12. In a specific gravity concentrating apparatus for obtaining values from aggregate or mass materials, the combination of a permeable bed having fluid-diffusing thickness portions along which the materials are to be advanced, a vibrating means for activating said bed, permeable flutes or riffles operably associated with said bed, means operably abutting endwise-engaging thickness portions of said bed, and yieldable means having preselected force characteristics, said yieldable means having portions actively positioned in operative association with said abutting means and said vibrating means and being connected through said abutting means to said bed to maintain thickness portions of said bed in compression, said yieldable means forcibly urging thickness portions of said bed towards said vibrating means and into effective vibration-transmitting association therewith.

13. In a specific gravity concentrating apparatus for obtaining values from aggregate or mass materials, the combination of a permeable concentrating bed having fluid-diffusing portions along which the materials are to be advanced, flutes or riffles operably associated with said bed, vibrating means having a straight-line vibrating element, and axial-joint means operably connecting said vibrating element to said concentrating bed solely at the center of gravity thereof.

14. In a specific gravity concentrating apparatus for obtaining values from aggregate or mass materials, the combination of a permeable concentrating bed having portions along which the materials are to be advanced, permeable flutes or riffles operably associated with said bed, vibrating means having a straight-line vibrating element, and axial-joint means operably connecting said vibrating element to said concentrating bed solely at the center of gravity thereof.

15. In a specific gravity concentrating apparatus for obtaining values from aggregate or mass materials, the combination of a permeable concentrating bed having portions along which the materials are to be advanced, a straight-line vibrating means, a frame for supporting the bed, yieldable means connected to forcibly urge said bed towards said frame, and axial-joint means operably connecting said vibrating means to said frame solely at the center of gravity of the frame and bed combination to provide a uniform transmission of straight-line vibrations to said bed.

16. In an apparatus as defined in claim 13, a yieldable means sealing off joints between adjacent permeable blocks of the bed from a gaseous fluid.

17. In a specific gravity concentrating apparatus for obtaining values from aggregate or mass materials, the combination of a permeable bed having portions along which the materials are to be advanced, flutes or riffles along the bed, vibrating means for said bed, bar means disposed along and between adjacent portions of the permeable bed, said bar means having portions connecting it to said bed, and yieldable means connected to said bar and to said vibrating means in such a manner as to forcibly urge said bed towards and connect it to said vibrating means.

18. In a specific gravity concentrating apparatus for obtaining values from aggregate or mass materials, the combination of a permeable bed having permeable portions along which the materials are to be advanced, flutes or riffles for said bed, vibrating means for activating said bed, yieldable means having actively-mobile portions operably disposed along a plane of the bed, and means operably connecting said yieldable means to forcibly urge said bed towards and into an effective vibration-transmitting relationship with said vibrating frame.

19. In a specific gravity concentrating apparatus for obtaining values from aggregate or mass materials, the combination of a bed having permeable portions along which the materials are to be advanced, flutes or riffles operably associated with said bed, a vibrating frame for activating said bed, means positioning said bed to abut said vibrating frame, and means operably associated with said means and being positioned to extend longitudinally of a plane representing advancement of the materials along said bed and having mobile portions connected to forcibly urge said bed into effective vibration-transmitting association with said vibrating frame.

20. In a specific gravity concentrating apparatus for obtaining values from aggregate or mass materials, the combination of a permeable concentrating bed having portions along which the materials are to be advanced, a vibrating frame for said bed, means positioning said bed to normally rest on and in abutment with said vibrating frame, means having actively-mobile portions connected operably to forcibly urge said bed towards said frame, and means connecting said last-mentioned means to said frame.

21. In a specific gravity concentrating apparatus for obtaining values from aggregate or mass materials, the combination of a bed having permeable portions along which the materials are to be advanced, flutes or riffles operably associated with said bed, vibrating means for activating said bed, said bed having one face thereof positioned in abutment with said vibrating means, pressure-exerting means having actively-mobile portions, and means operably positioning said pressure-exerting means between said vibrating means and said bed to forcibly urge portions of said bed along its extent towards said vibrating means in such a manner as to prevent a substantial dampening of vibrations produced thereby.

22. In a specific gravity concentrating apparatus for obtaining values from aggregate or mass materials, the combination of a bed having permeable portions along which the materials are to be advanced, flutes or riffles operably associated with said bed, a vibrating frame for activating and supporting said bed, yieldable means having mobile portions operably connected to forcibly urge said bed into effective vibration-transmitting association with said vibrating frame, said mobile portions being movable in substantial alignment with a plane of the bed in a direction representing advancement of materials therealong during a vibration-actuation of said bed by said vibrating frame.

23. In a specific gravity concentrating apparatus for obtaining values from aggregate or mass materials, the combination of a bed having permeable portions along which the materials are to be advanced, flutes or riffles operably associated with said bed, a vibrating frame for activating said bed, a plurality of yieldable means disposed along a dimension of said bed, and means operably connecting each of said yieldable means to said vibrating frame and to said bed, each of said yieldable means having an actively-mobile presser portion, said presser portion being constructed and arranged to yieldably urge said bed towards and against said vibrating frame in such a manner as to provide an effective vibration-transmitting relationship between said bed and said vibrating means.

24. In a specific gravity concentrating apparatus for obtaining values from aggregate or mass materials, the combination of a permeable bed having fluid-diffusing thickness portions along which the materials are to be advanced, vibrating means for activating said bed, flutes or riffles operably associated with said bed, means engaging said bed endwise of thickness portions thereof, means holding said last-mentioned means in such endwise engagement, and yieldable means having mobile portions operably connected to said first-mentioned means and to said vibrating means for holding said bed in an effective vibration-transmitting relationship with respect to said vibrating means.

25. In a specific gravity concentrating apparatus for obtaining values from aggregate or mass materials, the combination of a bed having permeable portions along which the materials are to be advanced, flutes or riffles operably associated with said bed, vibrating means for activating said bed, vibration-transmitting abutment means connected to said vibrating means and extending transversely of the permeable portions along which the materials are to be advanced, said bed having a transverse end thereof in abutment with said abutment means, and an actively-mobile pressure-exerting means operably positioned at an opposite end of said bed between said bed and said vibrating means to operably and forcibly urge said bed longitudinally into abutment with said abutment means.

26. In a specific gravity concentrating apparatus for obtaining values from aggregate or mass materials, the combination of a bed having permeable portions along which the materials are to be advanced, flutes or riffles operably associated with said bed, vibrating means for activating said bed, said bed having one side thereof positioned in abutment with said vibrating means, actively-mobile pressure-exerting means, and means operably positioned between said vibrating means and said side of the bed, said pressure-exerting means being connected to said vibrating means and to said positioning means to forcibly urge portions of said bed along its length towards said vibrating means in such a manner as to insure an efficient transmission of vibrations to said bed.

27. In a specific gravity concentrating apparatus for obtaining values of greater specific gravity from a material aggregate of lesser specific gravity, the combination of a permeable concentrating bed having portions over which a layer of the materials is to be advanced, means for vibrating said bed at a frequency of over 2100 cycles per minute and an amplitude of not over .25 inch, means for introducing a gaseous fluid through the permeable bed to subject the layer to flotation action, and means for connecting said vibrating means to said bed solely through the center of gravity thereof to insure a proper stratification of the layer by specific gravity, said vibrating means being operably disposed at an angle in a vertical plane with respect to said bed, so as to impart vibration thereto in a substantially vertical direction.

28. In a specific gravity concentrating apparatus for obtaining values of greater specific gravity from a material aggregate of lesser specific gravity, the combination of a permeable concentrating bed having portions over which a layer of the materials is to be advanced, means for vibrating said bed at a frequency of at least 2100 cycles per minute with an amplitude within the range of .001 to .025 inch, said vibrating means being operably disposed at an angle in a vertical plane with respect to said bed, so as to impart vibration thereto in a substantially vertical direction, means for transmitting the vibrations of said vibrating means to said bed solely at the center of gravity thereof, and means for maintaining the velocity of vibration of said vibrating means substantially equal to the rate of fall of heavy specific gravity values that are being recovered.

29. In a specific gravity concentrating apparatus for obtaining values of greater specific gravity from a material aggregate of lesser specific gravity, the combination of a permeable concentrating bed having portions over which a layer of the materials is to be advanced, means for directing a gaseous fluid through said bed to subject the layer to a flotation action, vibrating means connected to said bed solely at the center of gravity thereof to impart a straight-line vibration thereto in order to stratify the layer by specific gravity, said vibrating means being operably disposed at an angle in a vertical plane with respect to said bed, so as to impart vibration thereto in a substantially vertical direction.

JAMES H. KENNEDY.
ROSCOE F. BALLARD.